United States Patent
Mayr et al.

(10) Patent No.: US 10,954,711 B2
(45) Date of Patent: Mar. 23, 2021

(54) CONTROL DEVICE AND CONTROL METHOD FOR A VEHICLE HAVING AN AUTOMATICALLY OPENING AND/OR AUTOMATICALLY CLOSING HATCH

(71) Applicant: Bayerische Motoren Werke Aktiengesellschaft, Munich (DE)

(72) Inventors: Juergen Mayr, Munich (DE); Michael Thomas, Munich (DE); Florian Ammer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 273 days.

(21) Appl. No.: 15/995,785

(22) Filed: Jun. 1, 2018

(65) Prior Publication Data
US 2018/0298669 A1 Oct. 18, 2018

Related U.S. Application Data

(63) Continuation of application No. PCT/EP2016/079108, filed on Nov. 29, 2016.

(30) Foreign Application Priority Data

Dec. 2, 2015 (DE) ..................... 10 2015 224 108.4

(51) Int. Cl.
*E05F 15/73* (2015.01)
*B60R 25/20* (2013.01)

(52) U.S. Cl.
CPC .......... *E05F 15/73* (2015.01); *B60R 25/2054* (2013.01); *E05F 2015/763* (2015.01);
(Continued)

(58) Field of Classification Search
CPC . E05F 15/73; E05F 15/76; E05F 15/77; E05F 2015/763; E05F 2015/767; B60R 25/2054; B60R 25/24
See application file for complete search history.

(56) References Cited

U.S. PATENT DOCUMENTS 4,763,121 A * 8/1988 Tomoda ............. G07C 9/00309
340/10.42
5,677,665 A * 10/1997 Amano ............. G07C 9/00182
307/10.2

(Continued)

FOREIGN PATENT DOCUMENTS

DE  10 2004 041 709 B3  10/2005
DE  10 2010 006 213 A1  8/2011
(Continued)

OTHER PUBLICATIONS

International Search Report (PCT/ISA/210) issued in PCT Application No. PCT/EP2016/079108 dated Feb. 10, 2017 with English translation (six (6) pages).
(Continued)

*Primary Examiner* — Hunter B Lonsberry
*Assistant Examiner* — Luis A Martinez Borrero
(74) *Attorney, Agent, or Firm* — Crowell & Moring LLP

(57) ABSTRACT

A control device and method for a vehicle having an automatically opening and/or automatically closing flap includes an operating switch which can be operated contactlessly in the form of a proximity sensor and a programmable functional module. The method includes the following steps: firstly, an operating requirement signal is generated upon recognition of a predetermined proximity pattern consisting of the raw sensor signal of the proximity sensor for output of a resulting control signal to an unlocking and locking mechanism for the actual automatic opening or closing the valve, secondly, it is determined whether a predetermined absolute limit value of the raw sensor signal is exceeded, and thirdly, when the predetermined limiting value is exceeded, the output of the control signal is also suppressed when the operating requirement signal is gener-
(Continued)

ated, wherein this provision is also designated in short below as "suppression mode".

8 Claims, 2 Drawing Sheets

(52) U.S. Cl.
CPC ....... *E05Y 2400/44* (2013.01); *E05Y 2400/50* (2013.01); *E05Y 2400/852* (2013.01); *E05Y 2400/858* (2013.01); *E05Y 2800/424* (2013.01); *E05Y 2900/546* (2013.01); *E05Y 2900/548* (2013.01)

(56) References Cited

U.S. PATENT DOCUMENTS

| | | | | |
|---|---|---|---|---|
| 5,801,502 | A * | 9/1998 | Monzen | B60J 5/00 318/286 |
| 5,877,604 | A * | 3/1999 | Kessler | H02H 7/0833 318/434 |
| 6,236,333 | B1 | 5/2001 | King | B60R 25/2036 340/10.1 |
| 6,324,038 | B1 * | 11/2001 | Kishibe | H02P 29/032 361/31 |
| 6,907,323 | B2 | 6/2005 | Avenel | E05F 15/00 160/188 |
| 8,228,166 | B2 * | 7/2012 | Eberhard | B60R 25/2054 340/5.72 |
| 9,068,390 | B2 * | 6/2015 | Ihlenburg | E05F 15/73 |
| 9,214,083 | B2 * | 12/2015 | Lim | G08C 17/02 |
| 9,304,156 | B2 * | 4/2016 | Weingaertner | G01R 27/2605 |
| 9,446,739 | B2 * | 9/2016 | Herthan | G07C 9/30 |
| 9,637,049 | B2 * | 5/2017 | Russ | B60Q 5/005 |
| 9,689,982 | B2 * | 6/2017 | Herthan | E05B 81/76 |
| 9,707,929 | B2 * | 7/2017 | Holzberg | B60R 25/01 |
| 9,739,082 | B2 * | 8/2017 | Krauss | B60R 25/2054 |
| 10,065,600 | B2 * | 9/2018 | Motoki | E05F 15/73 |
| 10,131,319 | B2 * | 11/2018 | Honkanen | B60R 25/24 |
| 10,174,542 | B1 * | 1/2019 | Ramakrishnan | E05F 15/73 |
| 10,176,368 | B1 * | 1/2019 | Ramakrishnan | E05F 15/73 |
| 10,317,251 | B2 * | 6/2019 | Sterk | G01D 5/24 |
| 10,380,817 | B2 * | 8/2019 | Kim | E05B 81/78 |
| 10,443,294 | B2 * | 10/2019 | Goldmann | E05F 15/73 |
| 2005/0115757 | A1 * | 6/2005 | Konno | B60R 25/2063 180/289 |
| 2005/0179409 | A1 * | 8/2005 | Honma | G01P 3/489 318/62 |
| 2007/0205863 | A1 * | 9/2007 | Eberhard | B60R 25/2054 340/5.72 |
| 2008/0068145 | A1 * | 3/2008 | Weghaus | B60R 25/2054 340/426.25 |
| 2008/0231219 | A1 * | 9/2008 | Mori | H02P 3/22 318/434 |
| 2009/0160211 | A1 * | 6/2009 | Krishnan | E05B 81/78 296/146.4 |
| 2010/0198428 | A1 * | 8/2010 | Sultan | G07C 9/00309 701/2 |
| 2011/0175558 | A1 * | 7/2011 | Kitanaka | H02P 21/05 318/400.3 |
| 2011/0276234 | A1 * | 11/2011 | Van Gastel | E05B 81/78 701/49 |
| 2012/0245795 | A1 * | 9/2012 | Matsuzaki | A01B 63/1145 701/38 |
| 2012/0290177 | A1 | 11/2012 | Wagenhuber et al. | |
| 2013/0141212 | A1 * | 6/2013 | Pickering | H04B 1/3888 340/5.61 |
| 2013/0214900 | A1 * | 8/2013 | Mitchell | G07C 9/00309 340/5.61 |
| 2013/0234828 | A1 * | 9/2013 | Holzberg | B60R 25/01 340/5.72 |
| 2013/0291439 | A1 * | 11/2013 | Wuerstlein | G01V 3/12 49/357 |
| 2013/0321006 | A1 * | 12/2013 | Weingaertner | B60R 25/2054 324/679 |
| 2014/0207344 | A1 * | 7/2014 | Ihlenburg | E05F 15/74 701/49 |
| 2014/0303852 | A1 * | 10/2014 | Seki | E05F 15/40 701/49 |
| 2014/0324273 | A1 * | 10/2014 | Russ | E05F 15/76 701/29.1 |
| 2015/0009062 | A1 * | 1/2015 | Herthan | G01S 7/415 342/70 |
| 2015/0019046 | A1 * | 1/2015 | Jang | E05F 15/73 701/2 |
| 2015/0019084 | A1 * | 1/2015 | Chen | E05F 15/73 701/49 |
| 2015/0025751 | A1 * | 1/2015 | Sugiura | B60J 5/06 701/49 |
| 2015/0048927 | A1 * | 2/2015 | Simmons | G07C 9/00309 340/5.61 |
| 2015/0161834 | A1 * | 6/2015 | Spahl | G07C 9/00309 340/5.61 |
| 2016/0019734 | A1 * | 1/2016 | Bauman | G07C 9/20 340/5.61 |
| 2016/0024825 | A1 * | 1/2016 | Warschat | G01S 17/931 701/49 |
| 2016/0042579 | A1 * | 2/2016 | Austen | B60R 25/2018 340/5.61 |
| 2016/0325710 | A1 * | 11/2016 | Honkanen | B60R 25/209 |
| 2016/0347279 | A1 * | 12/2016 | Groeneveld | B60R 25/245 |
| 2017/0103592 | A1 * | 4/2017 | Buttolo | G07C 9/21 |
| 2017/0200335 | A1 * | 7/2017 | Da Deppo | G07C 9/00309 |
| 2018/0236972 | A1 * | 8/2018 | Linden | B60R 25/01 |
| 2018/0313133 | A1 * | 11/2018 | Goldmann | B60R 25/246 |
| 2020/0300025 | A1 * | 9/2020 | Suzuki | B60Q 9/008 |

FOREIGN PATENT DOCUMENTS

| | | |
|---|---|---|
| DE | 10 2013 018 594 A1 | 5/2015 |
| DE | 10 2014 221 244 A1 | 4/2016 |

OTHER PUBLICATIONS

German-language Written Opinion (PCT/ISA/237) issued in PCT Appliation No. PCT/EP2016/079108 dated Feb. 10, 2017 (six (6) pages).

German-language Search Report issued in counterpart German Application No. 102015224108.4 dated Jun. 21, 2016 with partial English translation (fifteen (15) pages).

* cited by examiner

CONTROL DEVICE AND CONTROL METHOD FOR A VEHICLE HAVING AN AUTOMATICALLY OPENING AND/OR AUTOMATICALLY CLOSING HATCH

CROSS REFERENCE TO RELATED APPLICATIONS

This application is a continuation of PCT International Application No. PCT/EP2016/079108, filed Nov. 29, 2016, which claims priority under 35 U.S.C. § 119 from German Patent Application No. 10 2015 224 108.4, filed Dec. 2, 2015, the entire disclosures of which are herein expressly incorporated by reference.

BACKGROUND AND SUMMARY OF THE INVENTION

The invention relates to a control device and a control method for a vehicle having an automatically opening and/or automatically closing hatch, wherein an operating switch, which can be actuated in a contactless manner, in the form of a proximity sensor is provided. An automatically opening and/or automatically closing hatch is to be understood to mean, in particular, either an automatically self-opening hatch or an automatically opening and automatically closing hatch.

A control device of this kind is known, for example, from DE 10 2004 041 709 B3 or DE 10 2010 006 213 A1.

The control device according to DE 10 2010 006 213 A1 relates to a vehicle having an automatically opening and/or automatically closing hatch, which has at least one programmable operating switch and a programmable electronic control module. The operating switch in the form of a proximity sensor underneath the bumper of the tail end of the vehicle can be actuated in a contactless manner deliberately (in particular, by a targeted movement of the foot) and, upon successful actuation, generates an operating request signal, which is the input signal of the control module. The control module is programmed in such a way that, in the presence of the operating request signal and, where appropriate, at least one further condition, it emits a pivot command to a closing mechanism for opening or closing the hatch (in particular the tailgate or trunk). The control module and/or the operating switch or proximity sensor are furthermore programmed in such a way that the operating request signals are counted, as long as at least one first stipulated condition has not yet been fulfilled, and that, upon reaching a defined maximum counter reading, the operating request signals are ignored until at least one second stipulated condition has been fulfilled.

The invention is based on the object of developing a hatch (flap) control system in such a way that, in particular, undesired closing of the hatch is prevented.

This and other objects are achieved by a control device according to the invention and a control method according to the invention for a vehicle having an automatically opening and/or automatically closing hatch, having an operating switch, which can be actuated in a contactless manner, in the form of a proximity sensor and having a programmable functional module that carries out the following method steps:

(1) firstly, upon identification of a prescribed proximity pattern from the raw sensor signal of the proximity sensor, an operating request signal is generated for emitting a control signal resulting therefrom to an unlocking and locking mechanism for the actual automatic opening or closing of the hatch, (2) secondly, it is determined whether a prescribed absolute limit value of the raw sensor signal has been exceeded, and (3) thirdly, upon exceeding of the prescribed limit value, the emission of the control signal is suppressed even in the case of a generated operating request signal, wherein this measure is also referred to in the following text as "suppression mode" for short.

The invention is based on the following insights.

In particular, an algorithm-based evaluation of a change in the field of a capacitive sensor system for contactless tailgate opening and closing is known. This function is, for example, a constituent part of the "Comfort Access" optional equipment in current BMW vehicles having a self-opening or automatically opening/closing tailgate. To this end, two capacitive sensor fields in the rear bumper are evaluated in terms of their characteristic change in capacitance (evaluation of the raw sensor signals). The characteristic for the change in capacitance is determined based on prescribable threshold values (parameters). A more detailed description of an arrangement that can be used for this purpose is illustrated and described in DE 10 2004 041 709 B3 or in DE 10 2010 006 213 A1, for example.

In this case, it is difficult to make a clear distinction between desired and undesired opening and closing commands. Until now, there has therefore always been a need for compromise between good target identification and prevention of undesired instances of triggering. The following vehicle user situations are particularly noteworthy: loading and unloading of the luggage compartment, sitting on the loading sill and touching (e.g. washing/polishing) of the rear bumper trim.

The invention therefore constitutes an expansion of the previous evaluation algorithm by a detection of the vehicle user position in the region of the rear bumper over an expanded evaluation of the raw sensor signals or the absolute capacitance values of the sensor system or the individual proximity sensors. The detection of the vehicle user position is thus realized by taking into account the basic capacitance and the change thereof when the vehicle user approaches. A valid operating request, which then leads to the actual opening or closing of the tailgate, may be emitted in accordance with the invention only when the basic capacitance has fallen again into a defined range (below a prescribed limit value) within a prescribable time criterion. The more detailed mode of functioning in this respect is explained in more detail with reference to the drawing of an exemplary embodiment.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
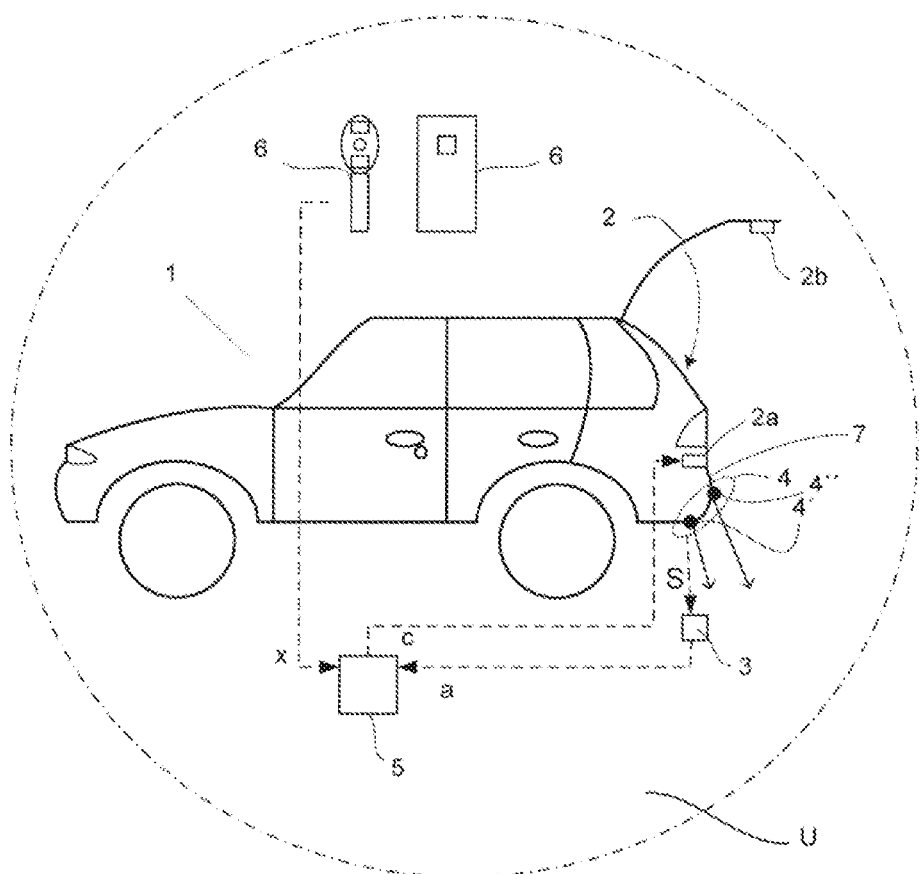
FIG. 1 is a schematic illustration of a motor vehicle having an automatically opening and/or closing hatch, which in this case is automatically closed, for example, from an open state on account of a close command, having a proximity sensor and two function modules according to an embodiment of the invention.

In the illustrated exemplary embodiment according to FIG. 1, the hatch 2 (also known as a flap) is designed as a tailgate of a motor vehicle 1. For example, in this case, automatic closing of the hatch 2 proceeding from an open state of the tailgate 2 is initiated at a locking and unlocking mechanism 2a, 2b by way of a close command in the form of a control signal c of a programmable control unit (in this case consisting of two functional modules 3 and 5). The tailgate 2 is then transferred to a closed position either on account of spring pretensioning or on account of an activated (e.g. electric, hydraulic or pneumatic) motor function.

The motor vehicle 1 further includes at least one proximity sensor, in this case in the form of a sensor system 4 having two partial proximity sensors 4' and 4" and a sensor signal evaluation module 3 as the first functional module according to the invention, which is operatively connected to the control module 5 as the second functional module according to the invention. In the following text, only one proximity sensor 4 is discussed for reasons of simplification. The proximity sensor 4 is a programmable operating switch, which can be deliberately actuated in a contactless manner. Upon successful actuation, said operating switch generates an operating request signal a, which is formed from a capacitance change signal or raw sensor signal S and is fed to the control module 5 as an input signal.

The control module 5, the sensor signal evaluation module 3 and the proximity sensor 4 can be separate but cooperating modules or can be integrated in one single electronic programmable functional module in the form of an electronic controller. The invention can be incorporated in each module in the form of a program or in the form of program parts. Preferably, separate modules are used, wherein a comparatively simple electronic module that consumes as little electrical energy as possible in the activated state is used for the proximity sensor 4.

The functional module 5 is preferably configured in such a way that not only the presence of the operating request signal a is monitored but also further stipulated conditions are monitored before said module emits a control signal c for opening or closing the tailgate. A further stipulated condition of this kind is, for example, the additional presence of a defined vehicle state signal x, which can be used, for example, to eliminate an unauthorized start-up of the vehicle. A state signal x of this kind can be, for example, an unlocking state signal of the central locking system or an identification signal about the presence of an access authorization device 6 in the locking state. For the second alternative, a check is carried out, for example, by including the control module 5, as to whether there is an access authorization device (generally a user carrying a radio key or a key card with them) within a prescribed region U around the vehicle. Monitoring devices of this kind are already known.

The at least one proximity sensor 4 is preferably arranged in such a way that a user can cause said proximity sensor to switch or can switch it by pivoting one's foot (short kick) in the region between the vehicle body and the road surface. In particular, the proximity sensor 4 is arranged underneath a bumper 7 or on the bottom side of a bumper 7 integrated therein.

If the operating request signal a and, preferably, additionally the signal x are present in the control module 5, the control module activates by way of the control signal c the unlocking/locking mechanism 2a, 2b in this case for actually automatically closing the hatch 2 when the following expansion function according to the invention is evaluated, which is explained in more detail in the following text with reference to FIG. 2.

Figure 2:
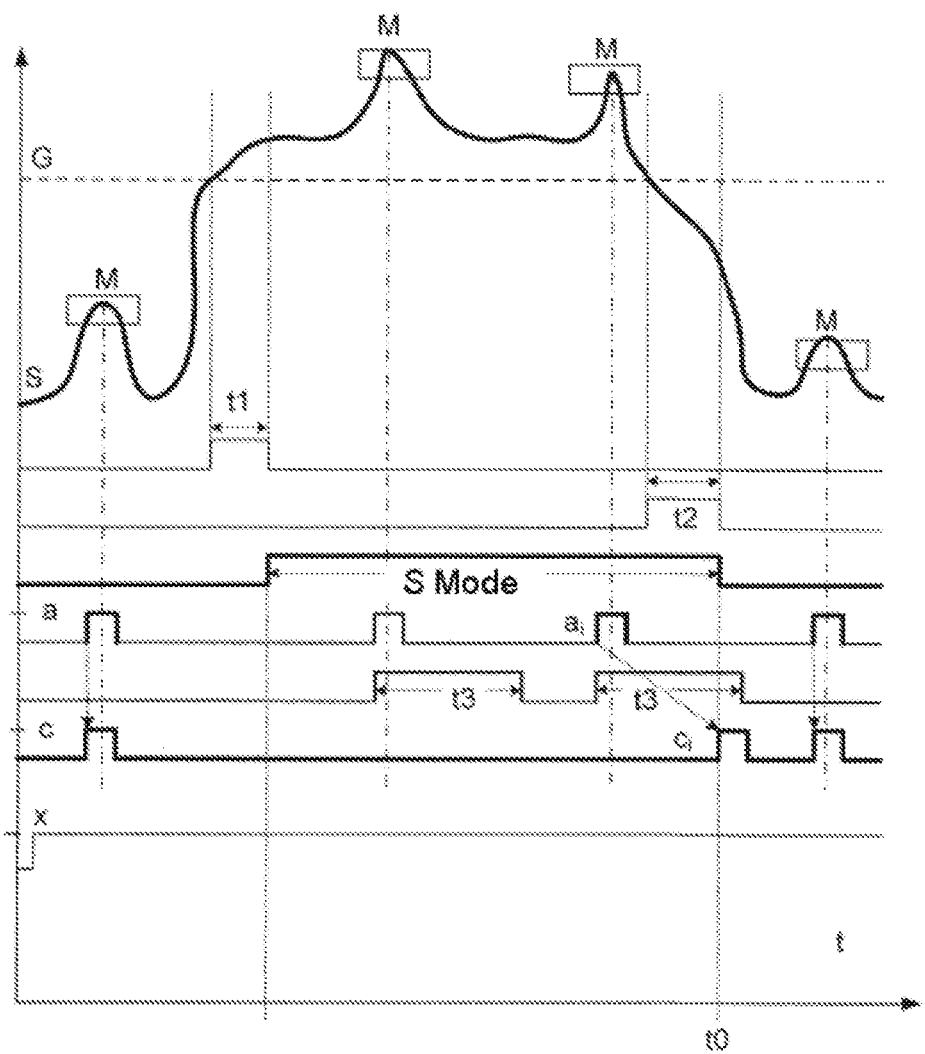
FIG. 2 shows possible signal sequences according to an embodiment of the invention.

FIG. 2 illustrates graphically the following signal profiles over time t:
the raw sensor signal S of the proximity sensor 4,
the first time window t1 for activating the suppression mode (S mode),
the second time window t2 for deactivating the suppression mode (S mode),
the activation and deactivation of the suppression mode (S mode),
the operating request signal a after identification of a prescribed proximity pattern M from the raw sensor signal S,
the third time window t3 for the possibly delayed emission of the control signal c,
the control signal c resulting from an operating request signal a in the non-suppression mode (normal mode), and
optionally the presence of a signal x for identifying the access authorization (e.g. radio key present).

An exceeding of a prescribed absolute limit value G of the raw sensor signal S is now checked according to the invention according to the signal profiles in FIG. 2. If the exceeding of the prescribed limit value G is determined at least for a prescribed first period t1, the suppression mode (S mode) is activated. In this case, the emission of the control signal c is also suppressed even in the case of a generated operating request signal a.

The suppression mode (S mode) is deactivated when the prescribed limit value G has been undershot at least for a prescribed second period t2.

In the case of a generated operating request signal $a_i$, during the suppression mode (S mode), a control signal $c_i$ resulting therefrom is preferably emitted in a delayed manner immediately after the deactivation of the suppression mode (S mode) when a prescribed third interval t3 between the generation of the operating request signal a, and the end of the suppression mode (S mode) in this case at the time t0 has not yet been exceeded.

The prescribed limit value is preferably determined in an empirical manner in such a way that a person who has been located very close to the bumper 7 for a relatively long time, for example sitting on the loading sill, can be inferred therefrom, for example.

The first time window t1 and the second time window t2 are likewise determined in an empirical manner in such a way that it is possible to identify a person located close to the vehicle for a longer time or a person located remote from the vehicle for a longer time again (e.g. in the range of 0 to 10 seconds).

The third time window t3 describes a period for which a possible operating request signal a is noticed by the customer and then discarded as possibly undesired (e.g. in the range of 0 to 5 seconds).

The raw sensor signal S comprises, in particular, all the capacitance change values that can be present both in absolute terms and in normalized or calibrated form.

The invention is applicable when a hatch 2 can be automatically opened and/or automatically closed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for a vehicle having an automatically opening and/or automatically closing hatch, which has at least one operating switch actuatable in a contactless manner, comprising:
 a proximity sensor forming the operating switch;
 at least one controller configured to:
  receive a raw sensor signal of the proximity sensor,
  upon identification of a prescribed proximity pattern from the raw sensor signal, generate an operating request signal,
  emit, in a non-suppression mode, a control signal resulting from the operating request signal to an unlocking and locking mechanism to automatically open or close the hatch,
  determine an exceeding of a prescribed limit value of the raw sensor signal and upon exceeding of the prescribed limit value,
   activate a suppression mode in which the emission of the control signal is suppressed even while the prescribed proximity pattern is identified to generate the operating request signal that would lead to the automatic opening or closing of the hatch during the non-suppression mode.

2. The control device as claimed in claim 1, wherein the exceeding of the prescribed limit value has to be present at least for a prescribed first period for activation of the suppression mode.

3. The control device as claimed in claim 2, wherein the undershooting of the prescribed limit value has to be present at least for a prescribed second period for deactivation of the suppression mode.

4. The control device as claimed in claim 3, wherein the at least one controller is further configured to:
 when an operating request signal is generated during the suppression mode emit the control signal resulting therefrom in a delayed manner after the deactivation of the suppression mode when a prescribed third interval between the generation of the operating request signal and the end of the suppression mode has not yet been exceeded.

5. The control device as claimed in claim 1, wherein undershooting of the prescribed limit value has to be present at least for a prescribed second period for deactivation of the suppression mode.

6. The control device as claimed in claim 1, wherein the at least one controller is further configured to:
 when an operating request signal is generated during the suppression mode emit the control signal resulting therefrom in a delayed manner after the deactivation of the suppression mode when a prescribed third interval between the generation of the operating request signal and the end of the suppression mode has not yet been exceeded.

7. A control method for a vehicle having an automatically opening and/or automatically closing hatch, which, via an operating switch in the form of a proximity sensor actuatable in a contactless manner, and by way of a controller, carries out the control method comprising:
 first, upon identification of a prescribed proximity pattern from raw sensor signal of the proximity sensor, generating an operating request signal for emitting, in a non-suppression mode, a control signal resulting from the operating request signal to an unlocking and locking mechanism to automatically open or close the hatch;
 second, determining whether a prescribed limit value of the raw sensor signal has been exceeded; and
 third, upon exceeding of the prescribed limit value, suppressing the emission of the control signal even while the prescribed proximity pattern is identified to generate the operating request signal that would lead to the automatic opening or closing of the hatch during the non-suppression mode.

8. A computer program product comprising a non-transitory computer readable medium having stored thereon program code sections that are operable, when executed by a processor, to:
 first, upon identification of a prescribed proximity pattern from raw sensor signal of a proximity sensor, generate an operating request signal for the emission, in a non-suppression mode, of a control signal resulting from the operating request signal to an unlocking and locking mechanism to automatically open or close a hatch;
 second, determine whether a prescribed limit value of the raw sensor signal has been exceeded; and
 third, upon exceeding of the prescribed limit value, suppress the emission of the control signal even while the prescribed proximity pattern is identified to generate the operating request signal that would lead to the automatic opening or closing of the hatch during the non-suppression mode.

* * * * *